(12) United States Patent
Widener

(10) Patent No.: US 8,522,553 B2
(45) Date of Patent: Sep. 3, 2013

(54) SYSTEM AND METHOD FOR CONDITIONING A WORKING FLUID IN A COMBUSTOR

(75) Inventor: Stanley Kevin Widener, Greenville, SC (US)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 13/232,191

(22) Filed: Sep. 14, 2011

(65) Prior Publication Data

US 2013/0061598 A1 Mar. 14, 2013

(51) Int. Cl.
*F02C 7/08* (2006.01)

(52) U.S. Cl.
USPC ............................................. 60/733; 60/737

(58) Field of Classification Search
USPC .................. 60/733, 737, 738, 723, 760, 742, 60/739
See application file for complete search history.

(56) References Cited

U.S. PATENT DOCUMENTS

| | | | |
|---|---|---|---|
| 3,751,911 A * | 8/1973 | De Tartaglia | 60/756 |
| 3,934,409 A * | 1/1976 | Quillevere et al. | 60/749 |
| 5,177,955 A * | 1/1993 | Shekleton | 60/804 |
| 5,295,354 A * | 3/1994 | Barbier et al. | 60/731 |
| 7,788,927 B2 * | 9/2010 | McMasters et al. | 60/739 |
| 2009/0031731 A1 | 2/2009 | Ziminsky et al. | |

* cited by examiner

*Primary Examiner* — Andrew Nguyen
(74) *Attorney, Agent, or Firm* — Dority & Manning, PA

(57) ABSTRACT

A system for conditioning a working fluid in a combustor includes a primary combustion chamber, a liner circumferentially surrounding the primary combustion chamber, and a primary nozzle in fluid communication with the primary combustion chamber. A secondary combustion chamber located outside of the primary combustion chamber includes a shroud that defines a fluid passage, a secondary nozzle, and means for igniting fuel in the secondary combustion chamber. A method for conditioning a working fluid in a combustor includes flowing the working fluid through a primary combustion chamber and flowing at least a portion of the working fluid through a secondary combustion chamber located outside of the primary combustion chamber. The method further includes flowing a fuel through the secondary combustion chamber, combusting the fuel, and flowing the combustion gases from the secondary combustion chamber into the primary combustion chamber.

16 Claims, 4 Drawing Sheets

SYSTEM AND METHOD FOR CONDITIONING A WORKING FLUID IN A COMBUSTOR

FIELD OF THE INVENTION

The present invention generally involves a system and method for conditioning a working fluid in a combustor. In particular, various embodiments of the present invention include one or more secondary combustion chambers arranged outside of a primary combustion chamber to condition the working fluid supplied to the primary combustion chamber.

BACKGROUND OF THE INVENTION

Commercial gas turbines are known in the art for generating power. A typical gas turbine used to generate electrical power includes an axial compressor at the front, one or more combustors around the middle, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows through one or more nozzles where it mixes with fuel and is injected into a combustion chamber where the fuel mixture ignites to generate combustion gases having a high temperature and pressure. The combustion gases then flow to the turbine where expansion of the combustion gases produces work. For example, expansion of the combustion gases in the turbine may rotate a shaft connected to a generator to produce electricity.

Various design and operating parameters influence the production of nitrous oxides, carbon monoxide, unburned hydrocarbons, and other undesirable emissions in the combustion gases that exit the turbine. For example, the combustion gas temperature directly influences the production of the various undesirable emissions. Specifically, a higher combustion gas temperature associated with higher power operation generally increases the disassociation rate of diatomic nitrogen, increasing the production of nitrogen oxides ($NO_x$). Conversely, a lower combustion gas temperature associated with reduced fuel flow and/or part load operation (turndown) generally reduces the chemical reaction rates of the combustion gases, increasing the production of carbon monoxide and unburned hydrocarbons. As another example, the residence time of the fuel mixture or combustion gases in the combustion chamber directly influences the production of the various undesirable emissions. Specifically, a longer residence time generally increases the $NO_x$ levels, while a shorter residence time generally increases the carbon monoxide and unburned hydrocarbon levels. Therefore, continued improvements in the combustor designs and methods for supplying fuel to the combustor would be useful to reducing undesirable emissions over a wide range of combustor operating levels.

BRIEF DESCRIPTION OF THE INVENTION

Aspects and advantages of the invention are set forth below in the following description, or may be obvious from the description, or may be learned through practice of the invention.

One embodiment of the present invention is a system for conditioning a working fluid in a combustor. The system includes a primary combustion chamber, a liner circumferentially surrounding at least a portion of the primary combustion chamber, and at least one primary fuel nozzle in fluid communication with the primary combustion chamber. At least one secondary combustion chamber is located outside of the primary combustion chamber. Each secondary combustion chamber includes a shroud that defines a fluid passage through the secondary combustion chamber, an opening at an upstream portion of the shroud, a secondary fuel nozzle proximate to the upstream portion of the shroud, and means for igniting fuel in the secondary combustion chamber.

Another embodiment of the present invention is a system for conditioning a working fluid in a combustor. The system includes a liner having an upstream end and a downstream end, a transition piece extending from the downstream end of the liner, and a primary combustion chamber defined at least in part by the liner and the transition piece. At least one secondary combustion chamber is located outside of the primary combustion chamber. Each secondary combustion chamber includes a shroud that defines a fluid passage through the secondary combustion chamber, a secondary fuel nozzle at an upstream portion of the shroud, and an igniter assembly installed in the secondary combustion chamber.

The present invention may also include a method for conditioning a working fluid in a combustor. The method may include flowing the working fluid through a primary combustion chamber and flowing at least a portion of the working fluid through a secondary combustion chamber located outside of the primary combustion chamber. The method further includes flowing a fuel through the secondary combustion chamber, combusting the fuel in the secondary combustion chamber to produce combustion gases, and flowing the combustion gases from the secondary combustion chamber into the primary combustion chamber.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
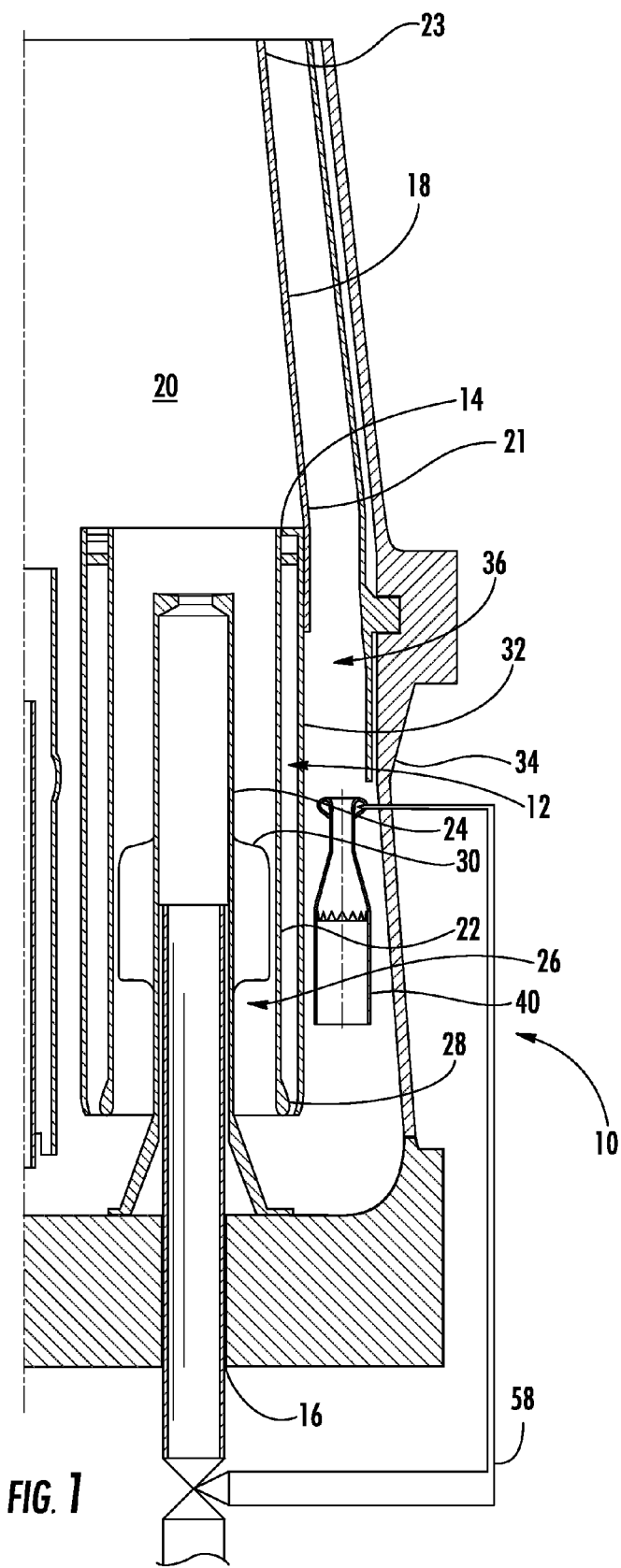
FIG. 1 is a simplified cross-section view of a head end of a combustor according to a first embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for conditioning a working fluid in a combustor. In particular embodiments, the combustor may include a primary combustion chamber with one or more secondary combustion chambers or pre-burners located outside of the primary combustion chamber. During lower power operations, the secondary combustion chamber may mix fuel, diluents, or other additives with a portion of the working fluid and ignite the mixture to produce combustion gases. The combustion gases exit the secondary combustion chamber and mix with the remaining working fluid to increase the temperature of the working fluid entering the primary combustion chamber. The higher temperature working fluid entering the primary combustion chamber increases the reaction rates of the combustion gases in the primary combustion chamber, allowing the combustor to be operated at lower load conditions and/or for longer periods without exceeding emissions limits associated with carbon monoxide and/or unburned hydrocarbons. Conversely, during higher power operation, the secondary combustion chamber may mix fuel, diluents, or other additives with a portion of the working fluid without igniting the mixture. The mixture exits the secondary combustion chamber and mixes with the remaining working fluid to allow a more complete mixing prior to entering the primary combustion chamber.

FIG. 1 provides a simplified cross-section view of a portion of a head end of a combustor 10 according to a first embodiment of the present invention. The combustor 10 may include one or more primary fuel nozzles 12 radially arranged between a cap 14 and an end cover 16. The cap 14 and a liner 18 generally surround and define a primary combustion chamber 20 located downstream from the primary fuel nozzles 12. For example, the cap 14 may extend radially across an upstream portion of the primary combustion chamber 20, and the liner 18 may comprise an upstream end 21 that extends downstream from the cap 14 to a downstream end 23 so that the liner 18 forms a cylinder that circumferentially surrounds at least a portion of the primary combustion chamber 20. As used herein, the terms "upstream" and "downstream" refer to the relative location of components in a fluid pathway. For example, component A is upstream from component B if a fluid flows from component A to component B. Conversely, component B is downstream from component A if component B receives a fluid flow from component A.

The design of the primary fuel nozzle 12 depends on the particular application, and the various embodiments of the present invention are not limited to any particular primary fuel nozzle 12 unless specifically recited in the claims. For example, as shown in FIG. 1, each primary fuel nozzle 12 may generally include a shroud 22 that circumferentially surrounds at least a portion of a center body 24 to define an annular passage 26 between the shroud 22 and the center body 24. The center body 24 generally extends axially through the primary nozzle 12 from the end cover 16 toward the cap 14 to provide fluid communication for fuel, diluents, or other additives to flow from the end cover 16, through the center body 24, and into the combustion chamber 20. The shroud 22 may include a bellmouth shape 28 at the upstream opening to enhance the radial distribution of the working fluid flowing through the annular passage 26 between the shroud 22 and the center body 24. In addition, one or more vanes 30 may extend radially inward from one or more shrouds 22 to the center body 24 to impart a tangential swirl to the compressed working fluid to enhance mixing with the fuel, diluents, or other additives prior to combustion.

As shown in FIG. 1, a cap shield 32 may circumferentially surround the primary nozzles 12 between the cap 14 and the end cover 16, and a casing 34 may surround the liner 18 and cap shield 32 to define an axis-symmetric annular passage 36 that circumferentially surrounds the primary combustion chamber 20 and primary fuel nozzles 12. The working fluid may flow through the annular passage 36 to provide impingement and/or convective cooling to the liner 18 and/or cap shield 32. When the working fluid reaches the end cover 16, the working fluid reverses direction to flow through the one or more primary fuel nozzles 12 where it mixes with fuel, diluents, or other additives before igniting in the primary combustion chamber 20 to produce combustion gases having a high temperature and pressure.

As shown in FIG. 1, the combustor 10 further includes at least one secondary combustion chamber 40 located outside of the primary combustion chamber 20. Each secondary combustion chamber 40 generally comprises a small pre-mixed burner that that may be used to condition the working fluid during various power operations. For example, the one or more secondary combustion chambers 40 may be used to preheat the working fluid flowing into the primary fuel nozzles 12 during extended low power operations. Approximately 5-10% of the total fuel supplied to the primary combustion chamber 20 may be diverted to the secondary combustion chambers 40 and ignited to produce combustion gases outside of the primary combustion chamber 20. The combustion gases from the secondary combustion chambers 40 may then mix with the remaining working fluid to raise the bulk temperature of the working fluid flowing through the primary fuel nozzles 12 and into the primary combustion chamber 20. For example, the combustion gases from the secondary combustion chambers 40 may raise the bulk temperature of the working fluid flowing through the primary fuel nozzles 12 by approximately 200-400° F. The increased bulk temperature of the working fluid will promote more complete combustion in the primary combustion chamber 20, thus extending the boundaries for turndown associated with lean blowout and/or carbon monoxide and unburned hydrocarbon emissions. During higher power operation, the combustion in the secondary combustion chambers 40 may be extinguished, and fuel, diluents, or other additives may be injected through the secondary combustion chamber 40 to mix with the working fluid prior to entry in the primary combustion chamber 20.

The specific location and design of the secondary combustion chambers 40 is such that the combustion gases or other fluids exiting the secondary combustion chambers 40 have sufficient time to evenly mix with the remaining working fluid prior to reaching the primary fuel nozzles 12 to reduce hot zones, streaks, and/or uneven concentrations of fuel, diluents, or other additives flowing through the primary fuel nozzles 12. For example, as shown in FIG. 1, at least one secondary combustion chamber 40 may be located in the annular passage 36 surrounding the primary combustion chamber 20.

Figure 2:
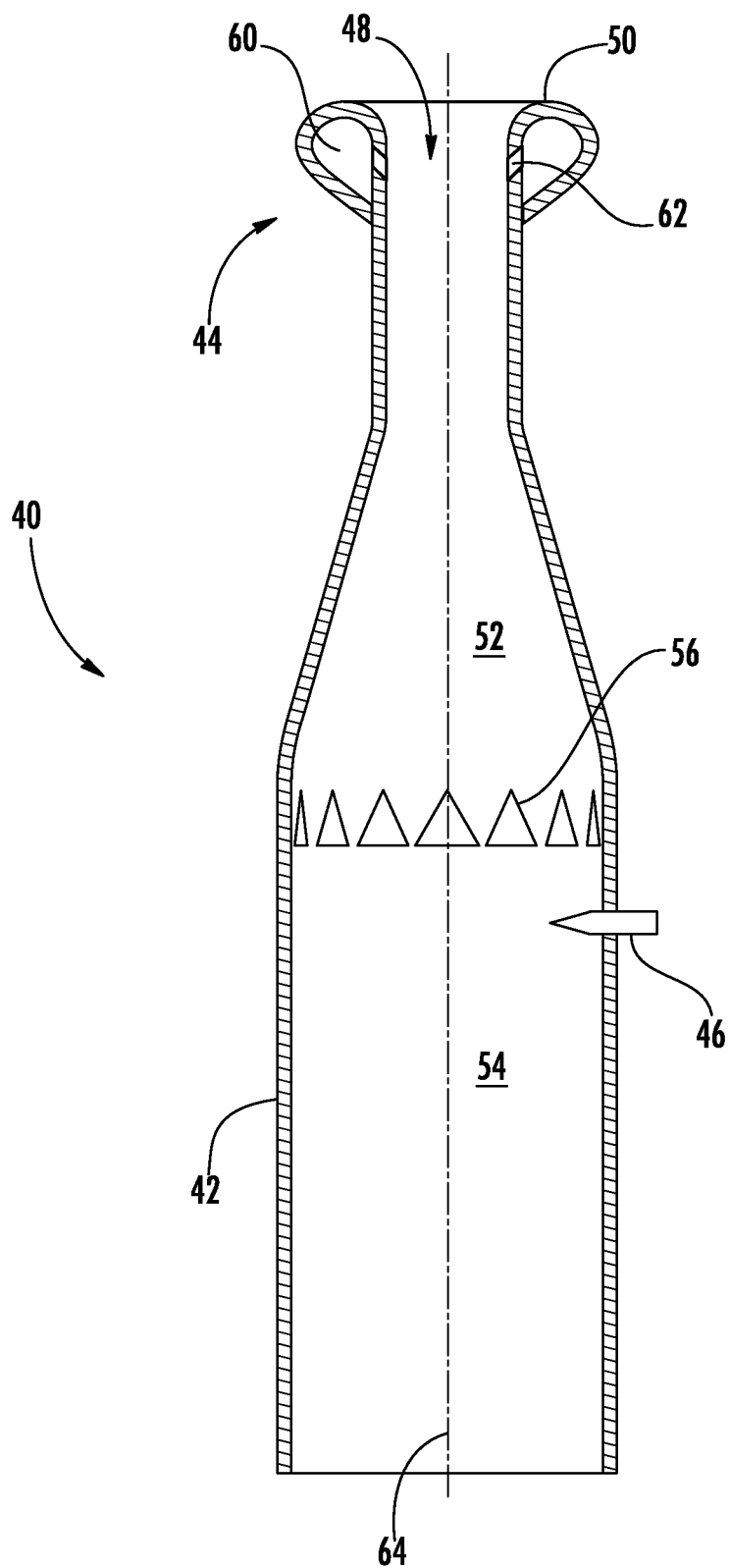
FIG. 2 is an enlarged cross-section view of the secondary combustion chamber shown in FIG. 1 according to one embodiment of the present invention.

FIG. 2 provides an enlarged cross-section view of the secondary combustion chamber 40 shown in FIG. 1 according to one embodiment of the present invention. As shown, the secondary combustion chamber 40 may include a shroud 42, a secondary fuel nozzle 44, and means for igniting fuel in the secondary combustion chamber 40.

The shroud 42 generally surrounds the secondary combustion chamber 40 to define a fluid passage 48 through the secondary combustion chamber 40. An upstream portion of the shroud 42 may include a bellmouth opening 50, swirler vanes, or other structure to enhance the radial distribution and/or impart a tangential swirl to the working fluid flowing through the fluid passage 48. The fluid passage 48 may include a mixing zone 52 and a burnout zone 54 separated by a flame holder 56. The upstream portion of the shroud 42 may also include a plurality of ports 62 for injecting fuel, diluents, or other additives into the working fluid. The mixing zone 52 may comprise a gradually increasing diameter that reduces the velocity of the working fluid to enhance mixing between the working fluid and any fuel, diluents, or other additives injected by the secondary fuel nozzle 44. The axial length of the burnout zone 54 may be selected to allow the chemical reaction associated with the combustion gases to substantially consume the carbon monoxide and unburned hydrocarbons produced in the secondary combustion chamber 40. The gradually increasing diameter of the mixing zone 52 may be selected to provide enhanced stability of the combustion flame in the burnout zone 56, as well as to prevent upstream migration of the flame toward the injection ports 62, possibly damaging the secondary fuel nozzle 44. The flame holder 56 may comprise any suitable structure known to one of ordinary skill in the art for stabilizing a flame associated with the combustion. For example, the flame holder 56 may comprise a triangular, cylindrical, or airfoil-shaped bluff body that creates a differential pressure across the fluid passage 48 to maintain the flame associated with the combustion downstream from the flame holder 56.

The secondary fuel nozzle 44 is in fluid communication with a supply of fuel, diluents, and/or other additives. For example, the secondary fuel nozzle 44 may be connected to a plenum inside the combustor 10 that supplies fuel, diluents, and/or other additives to one or more injectors (not shown) radially arranged around the primary combustion chamber 20. Alternately, or in addition, as shown in FIG. 1, the secondary fuel nozzle 44 may be connected to a plenum 58 located outside of the combustor 10 that also supplies fuel, diluents, and/or other additives to the primary fuel nozzle 12. The secondary fuel nozzle 44 may comprise an annular plenum 60 surrounding the shroud 42 proximate to the bellmouth opening 50 to inject fuel, diluents, and/or other additives with the working fluid entering the mixing zone 52 of the fluid passage 48. The plurality of ports 62 in the secondary fuel nozzle 44 may provide fluid communication from the annular plenum 60 into the mixing zone 52 of the fluid passage 48. In particular embodiments, the plurality of ports 62 may be angled at least one of radially or azimuthally with respect to an axial centerline 64 of the fluid passage 48 to impart a tangential swirl to the fuel, diluents, or other additives flowing from the annular plenum 60 into the mixing zone 52.

The means for igniting fuel in the secondary combustion chamber 40 provides an ignition source inside or proximate to the secondary combustion chamber 40 to ignite fuel flowing through the secondary combustion chamber 40 when desired. For example, during some operating conditions, it may be desirable to supply fuel through the secondary combustion chamber 40 without igniting the fuel to allow the fuel more time to mix with the working fluid prior to entry into the primary combustion chamber 20. During other operating conditions, the means for igniting the fuel in the secondary combustion chamber 40 may be used to ignite the fuel flowing through the secondary combustion chamber 40 to increase the temperature of the working fluid prior to entry into the primary combustion chamber 20. The structure for igniting fuel in the secondary combustion chamber 40 may comprise, for example, a torch, a sparkplug, a laser, or another suitable device known to one of ordinary skill in the art for igniting fuel. In the particular embodiment shown in FIG. 2, for example, the means for igniting fuel comprises an igniter assembly 46 inside or proximate to the secondary combustion chamber 40. The igniter assembly 46 may comprise, for example, a sparkplug or a laser adapted for installation at least partially inside the secondary combustion chamber 40 to project a spark or beam into the secondary combustion chamber 40.

Figure 3:
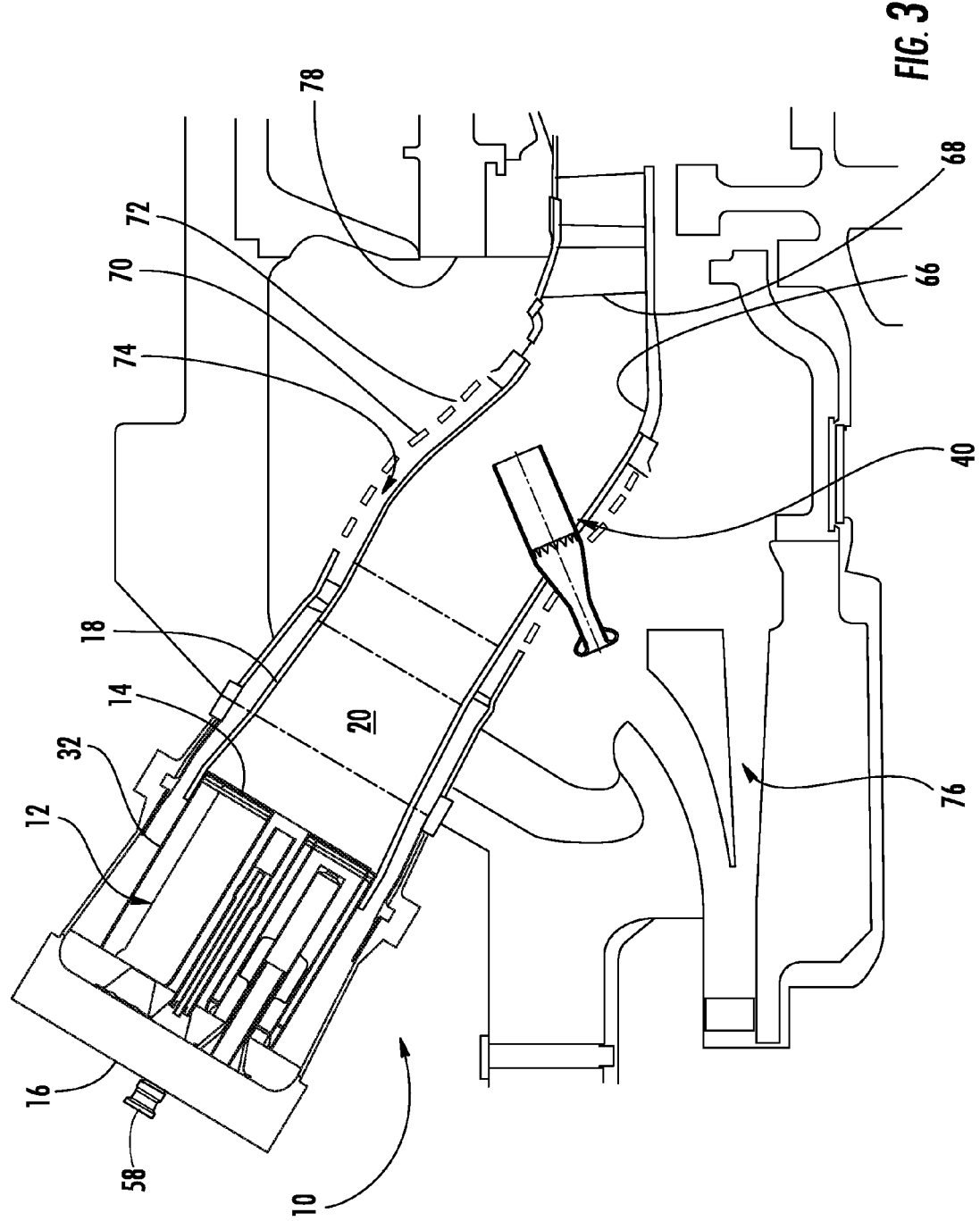
FIG. 3 is a simplified cross-section view of a combustor according to a second embodiment of the present invention.
Figure 4:
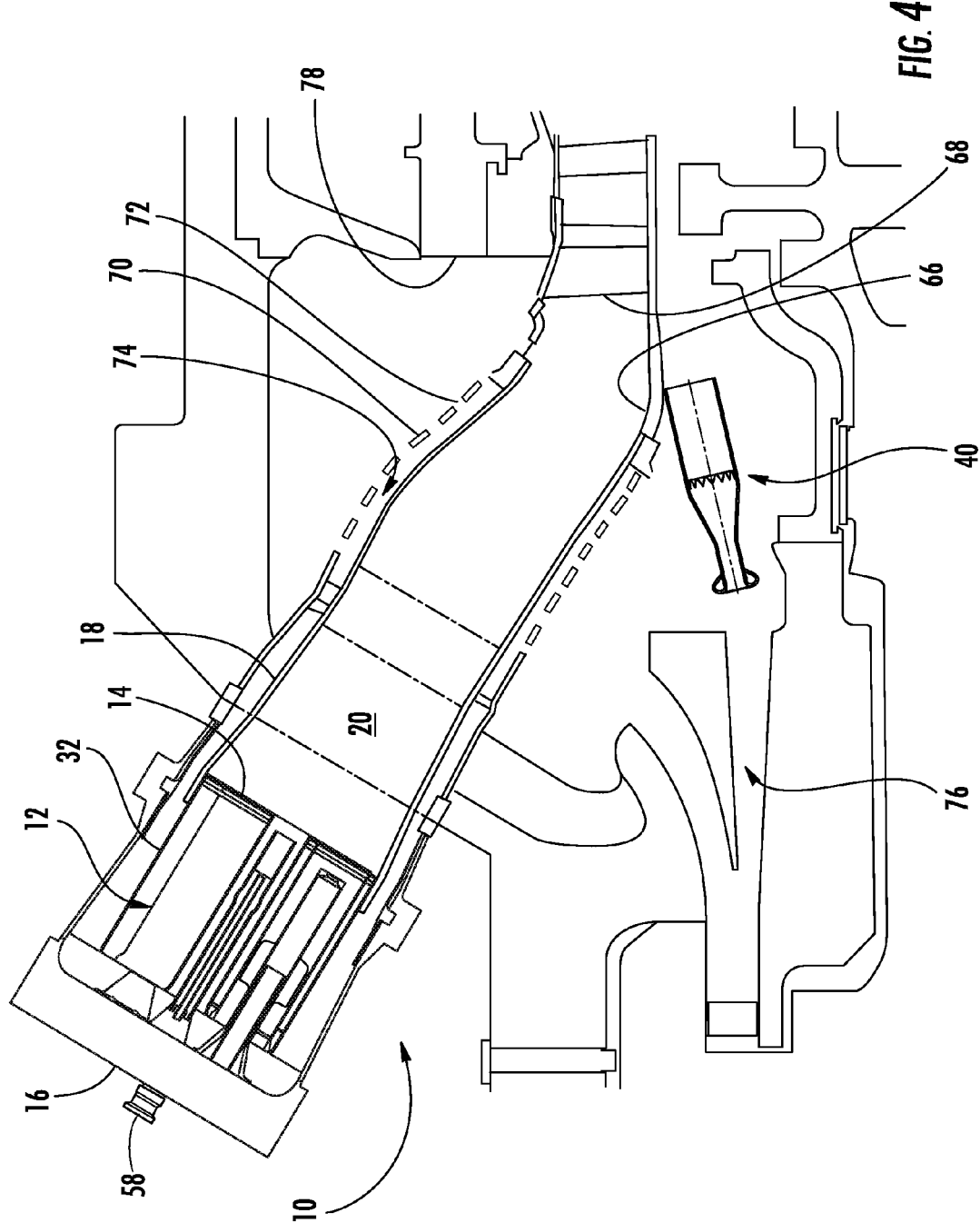
FIG. 4 is a simplified cross-section view of a combustor according to a third embodiment of the present invention.

FIGS. 3 and 4 provide simplified cross-section views of the combustor 10 according to alternate embodiments of the present invention. In each embodiment, the combustor 10 again includes one or more primary fuel nozzles 12, the cap 14, the end cover 16, the liner 18, and the primary combustion chamber 20 as previously described with respect to the embodiment shown in FIG. 1. In addition, the combustor 10 includes a transition piece 66 extending from the downstream end 23 of the liner 18 and surrounding at least a portion of the primary combustion chamber 20. The transition piece 66 connects the primary combustion chamber 20 to a turbine inlet 68 so that combustion gases from the primary combustion chamber 20 may flow into the turbine inlet 68. An impingement sleeve 70 with flow holes 72 may surround the transition piece 66 to define an annular plenum 74 between the impingement sleeve 70 and the transition piece 66. The working fluid may pass through the flow holes 72 in the impingement sleeve 70 and flow through the annular plenum 74 to provide convective cooling to the transition piece 66 and liner 18. As previously described, when the working fluid reaches the end cover 16, the working fluid reverses direction to flow through the primary nozzles 12 where it mixes with fuel before igniting in the primary combustion chamber 20.

As shown in FIGS. 3 and 4, the combustor 10 again includes one or more secondary combustion chambers 40 as previously described with respect to FIG. 2. In the embodiments shown in FIGS. 3 and 4, the secondary combustion chambers 40 are located downstream from a compressor discharge diffuser 76 and proximate to the transition piece 66. In this location, the secondary combustion chambers 40 may again be used to condition the working fluid as previously described, and the additional distance between the secondary combustion chambers 40 and the primary fuel nozzles 12 allows for additional mixing between the working fluid and the gases exiting the secondary combustion chamber 40 before reaching the primary fuel nozzles 12. In addition, the secondary combustion chamber 40 may be oriented so that the combustion gases exiting the secondary combustion chamber 40 may be directed to particular components in the gas turbine. For example, as shown in FIG. 3, the secondary combustion chamber 40 may be oriented so that the combustion gases exiting the secondary combustion chamber 40 are directed at an inner turbine vane support 78. In this manner, the combustion gases may actively heat the inner turbine vane support 78 to provide a measure of active clearance control between the inner turbine vane support 78 and various rotating components in the hot gas path of the turbine. Alternately, as shown in FIG. 4, the secondary combustion chamber may be oriented so that the combustion gases exiting the secondary combustion chamber 40 are directed at the transition piece 66. In this manner, the combustion gases may flow through the flow holes 72 in the impingement sleeve 70 to raise the temperature of the working fluid flowing over the transition piece and/or liner. This in turn may increase the temperature in the boundary layers adjacent to the transition piece 66 and/or liner 18 inside the primary combustion chamber 20 to reduce carbon monoxide reaction quenching in the boundary layers.

The various embodiments shown in FIGS. 1-4 may also provide a method for conditioning the working fluid in the combustor 10. The method may include flowing the working fluid through the primary combustion chamber 20 and flowing at least a portion of the working fluid through one or more secondary combustion chambers 40 located outside of the primary combustion chamber 20. Depending on the particular operating condition of the combustor 10, the method may further include flowing fuel, diluents, and/or other additives through the secondary combustion chamber 40, combusting the fuel in the secondary combustion chamber 40 to produce combustion gases, and flowing the combustion gases from the secondary combustion chamber 40 into the primary combustion chamber 20.

In particular embodiments the method may include swirling the fuel, diluents, and/or other additives flowing through the secondary combustion chamber 40 and/or flowing the fuel, diluents, and/or other additives across the flame holder 58. Alternately, or in addition, the method may include flowing the combustion gases exiting the secondary combustion chamber 40 toward at least one of the inner turbine vane support 78 or exterior surface of the primary combustion chamber 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for conditioning a working fluid in a combustor, comprising:
   a. a primary combustion chamber;
   b. a liner circumferentially surrounding at least a portion of the primary combustion chamber;
   c. at least one primary fuel nozzle in fluid communication with the primary combustion chamber;
   d. at least one secondary combustion chamber located upstream from the at least one primary fuel nozzle, wherein each secondary combustion chamber comprises:
      i. a shroud, wherein the shroud defines a fluid passage having a centerline through the secondary combustion chamber;
      ii. an opening at an upstream portion of the shroud;
      iii. a secondary fuel nozzle proximate to the upstream portion of the shroud; and
      iv. means for igniting fuel in the secondary combustion chamber;
      wherein the at least one secondary combustion chamber and the centerline are located in an annular passage surrounding the primary combustion chamber.

2. The system as in claim 1, wherein the secondary fuel nozzle comprises an annular plenum surrounding the shroud.

3. The system as in claim 1, wherein the secondary fuel nozzle comprises a plurality of ports angled at least one of radially or azimuthally with respect to the centerline of the fluid passage.

4. The system as in claim 1, further comprising a flame holder in the fluid passage.

5. The system as in claim 1, further comprising a bellmouth opening at the upstream portion of the shroud.

6. A system for conditioning a working fluid in a combustor, comprising:
   a. a liner having an upstream end and a downstream end;
   b. a transition piece extending from the downstream end of the liner;
   c. a primary combustion chamber defined at least in part by the liner and the transition piece, wherein the primary combustion chamber includes at least one primary fuel nozzle;
   d. at least one secondary combustion chamber located upstream from the at least one primary fuel nozzle, wherein each secondary combustion chamber comprises:
      i. a shroud, wherein the shroud defines a fluid passage having a centerline through the secondary combustion chamber;
      ii. a secondary fuel nozzle at an upstream portion of the shroud; and
      iii. an igniter assembly installed in the secondary combustion chamber;
      wherein the at least one secondary combustion chamber and the centerline are located in an annular passage surrounding the primary combustion chamber.

7. The system as in claim 6, wherein the secondary fuel nozzle comprises an annular plenum surrounding the shroud.

8. The system as in claim 6 wherein the secondary fuel nozzle comprises a plurality of ports angled at least one of radially or azimuthally with respect to the centerline of the fluid passage.

9. The system as in claim 6, further comprising a flame holder in the fluid passage.

10. The system as in claim 6, further comprising a bellmouth opening at an upstream portion of the shroud.

11. A method for conditioning a working fluid in a combustor, comprising:
    a. flowing the working fluid through a primary fuel nozzle in fluid communication with a primary combustion chamber;
    b. flowing at least a portion of the working fluid through a secondary combustion chamber located upstream from the primary fuel nozzle and outside of a liner surrounding the primary combustion chamber, wherein the secondary combustion chamber comprises a shroud defining a fluid passage having a centerline through the secondary combustion chamber and wherein the secondary combustion chamber and the centerline are located in an annular passage surrounding the primary combustion chamber;
    c. flowing a fuel through the secondary combustion chamber;
    d. combusting the fuel in the secondary combustion chamber to produce combustion gases; and
    e. flowing the combustion gases from the secondary combustion chamber into the primary combustion chamber.

12. The method as in claim 11, further comprising flowing the portion of the working fluid through the secondary combustion chamber located outside of a liner surrounding the primary combustion chamber.

13. The method as in claim 11, further comprising swirling the fuel flowing through the secondary combustion chamber.

14. The method as in claim 11, further comprising flowing the fuel and working fluid in the secondary combustion chamber across a flame holder.

15. The method as in claim 11, further comprising flowing a diluent through the secondary combustion chamber.

16. The method as in claim 11, further flowing the combustion gases toward at least one of a turbine shroud or an exterior surface of the primary combustion chamber.

* * * * *